United States Patent
Tate et al.

(10) Patent No.: US 12,403,415 B2
(45) Date of Patent: Sep. 2, 2025

(54) STAR PLEATING WITH INSIDE OUT FLOW HAVING WATER DRAINAGE THROUGH THE CENTER

(71) Applicant: Parker-Hannifin Corporation, Cleveland, OH (US)

(72) Inventors: Jason L. Tate, Thompsons Station, TN (US); Sreevalli Bokka, Akron, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 590 days.

(21) Appl. No.: 17/691,704

(22) Filed: Mar. 10, 2022

(65) Prior Publication Data

US 2022/0193579 A1     Jun. 23, 2022

Related U.S. Application Data

(63) Continuation of application No. PCT/US2020/051497, filed on Sep. 18, 2020.

(60) Provisional application No. 63/042,645, filed on Jun. 23, 2020, provisional application No. 62/906,972, filed on Sep. 27, 2019.

(51) Int. Cl.
*B01D 29/23*     (2006.01)
*B01D 36/00*     (2006.01)

(52) U.S. Cl.
CPC ......... *B01D 29/232* (2013.01); *B01D 36/003* (2013.01); *B01D 2201/122* (2013.01); *B01D 2201/29* (2013.01); *B01D 2201/34* (2013.01)

(58) Field of Classification Search
None
See application file for complete search history.

(56) References Cited

U.S. PATENT DOCUMENTS

| | | | |
|---|---|---|---|
| 2,627,350 A | 2/1953 | Wicks | |
| 5,084,170 A | 1/1992 | Janik et al. | |
| 5,637,215 A | 6/1997 | Albers, Jr. | |
| 5,674,393 A | 10/1997 | Terhune et al. | |
| 7,462,282 B2 | 12/2008 | Mees et al. | |
| 7,645,312 B2 | 1/2010 | Hamlin et al. | |
| 11,278,833 B2 | 3/2022 | Tate et al. | |
| 2003/0136726 A1* | 7/2003 | Gruca | B01D 17/0202 210/493.1 |
| 2009/0078626 A1* | 3/2009 | Krull | B01D 46/001 210/232 |
| 2009/0308803 A1 | 12/2009 | Beard et al. | |
| 2010/0089819 A1* | 4/2010 | Hamlin | B01D 46/0036 210/490 |
| 2018/0214806 A1* | 8/2018 | Tate | B01D 46/0001 |
| 2019/0282930 A1* | 9/2019 | Wieczorek | B01D 17/04 |

FOREIGN PATENT DOCUMENTS

| | | |
|---|---|---|
| DE | 4345130 C1 | 11/2000 |
| GB | 2106409 A | 4/1983 |
| WO | WO 2016/004365 A1 | 1/2016 |
| WO | WO 2019/118260 A1 | 6/2019 |
| WO | WO 2019/145358 A1 | 8/2019 |

* cited by examiner

*Primary Examiner* — Ryan B Huang
*Assistant Examiner* — Tak L Chiu
(74) *Attorney, Agent, or Firm* — Reinhart Boerner Van Deuren P.C.

(57) ABSTRACT

A filter cartridge includes an open-ended housing and filter element supported in the housing and defining an annular region between a periphery of the filter element and a side housing wall. A water collection region is between an end of the filter element and a lower-housing wall. The filter element includes pleated media surrounding an axially-extending central area, and pleats of different heights round the central area. An end plate is bonded to the filter element to prevent fluid flow through the pleats' upper ends. One passage is through a plate opening into the central area. Another passage is between the end plate and peripheral region. The filter element has freely-supported lower ends. A seal between the lower periphery of the filter element and the housing prevents fluid bypass of the filter element. Fluid passes through the pleats, and water coalesces on the media and drains into the collection region.

15 Claims, 3 Drawing Sheets

STAR PLEATING WITH INSIDE OUT FLOW HAVING WATER DRAINAGE THROUGH THE CENTER

CROSS-REFERENCE TO RELATED PATENT APPLICATIONS

This patent application is a continuation of U.S. PCT Patent Application No. PCT/US2020/051497, filed Sep. 18, 2020, which is now pending, which claims the benefit of U.S. Provisional Patent Application No. 63/042,645, filed Jun. 23, 2020, and claims the benefit of U.S. Provisional Patent Application No. 62/906,972, filed Sep. 27, 2019, the entire teachings and disclosure of which are incorporated herein by reference thereto.

FIELD OF THE INVENTION

This invention generally relates to a filter cartridge.

BACKGROUND OF THE INVENTION

Fluid filters are routinely used for removing contaminants from liquids, such as fuel or oil, or gases to prevent damage to downstream components, such as motors, machinery, engines, etc. Filtration systems are generally configured so that incoming contaminated fluid moves along a flow path until it encounters filter material. As the fluid passes through the filter material, a sufficient amount of the contaminants will be captured by the filter material so that the fluid exiting the filter is considered to be clean enough for the particular use of the resultant fluid.

There are a number of different filter configurations that are available for use in a variety of applications. In relatively simple configurations, a single flat sheet of filter material is positioned in the fluid flow path such that contaminated fluid flows from a "dirty" side of the filter media through the media to the "clean" side. Generally, such a flat filter sheet is configured in a manner that allows the filter material to capture solid contaminants of a certain size and/or composition.

One technique that has been used to improve the performance of filter elements involve the use of pleated filter media. Pleating the filter media serves to increase the amount of filter media used in a given amount of space. In certain applications, the filter media is pleated in an accordion-like manner in order to create multiple pleats across the length or width of the filter media. Generally, the pleats crated for these types of filter elements will include pleats of the same or similar height across the length or width of the filter element.

Embodiments of the invention provides an improvement to the state of the art with respect to filter cartridges. These and other advantages of the invention, as well as additional inventive features, will be apparent from the description of the invention provided herein.

BRIEF SUMMARY OF THE INVENTION

Embodiments of the present invention relate to a filter element including a star pleating geometry that uses pleats having variable radial heights, in some cases up to three or more pleating heights connected together to form a continuous web. The outer diameter of the pleated media pack is the same for each pleat, while the inner diameter is different for each of the unique pleat heights. In the embodiments disclosed, there are three unique pleat heights, though embodiments of the invention may include pleated filter elements with more or less than three unique pleat heights.

In particular embodiments, the pleats on the drainage end of the media cylinder are sealed together, creating pocket pleats similar to a panel air filter. The perimeter or outer diameter, and, in one example, the first 0.25-of-an-inch section of each pleat, is sealed together and to the filter housing. In one instance, this 0.25 of an inch is measured radially inward from the perimeter of the annular filter element. As such, when contaminated fluid, such as fuel, enters the center of the filter cartridge media pack at the top thereof, and then travels through the media to the outside of the filter element between the media pack and filter housing, water is separated from the fluid. The separated water then drains down into the collection bowl.

An additional benefit of the design disclosed herein is the elimination of the structural center tube, which reduces the cost of manufacturing and simplifies the assembly process. The deeper pleats, i.e., those with the greatest radial height, alternatively add to the strength of the filter element and allowing for the elimination of the center tube. In addition, the deeper pleats add surface area, thereby improving water separation performance. In some embodiments, embossments are added to the surface to the pleats to further increase the structural strength of the pleated media.

Embodiments of the invention include filter cartridges in which the fluid flows into the center of the cylinder and out through the periphery of the cylinder or vice versa. The fluid flow path provided in the filter cartridge disclosed is also more direct and streamlined, when compared to conventional filter cartridges, thereby improving restriction and increasing separation efficiency of the claimed filter cartridge. These embodiments may include a solid endcap on one end and a hybrid open endcap on the other end, where pocket pleats are used to seal the pleats and pass through the inner diameter skirt of the open endcap.

Prior art includes U.S. patent application Ser. No. 16/541, 921, filed on 19 Jan. 2018, entitled "Filter Media Packs, Methods of Making, and Ultrasonic Cutting or Welding", the entire disclosure of which is incorporated herein by reference thereto.

In one aspect, embodiments of the invention provide a filter cartridge that includes a cup-shaped housing with an open end, and an annular filter element supported in the housing and defining an annular peripheral region between an outer periphery of the filter element and a side wall of the housing. There is a lower water collection region between a lower end of the filter element and a lower wall of the housing. The filter element includes pleated media surrounding an axially-extending central area, with the media having pleats of different radial heights arranged circumferentially around the central area.

There is an annular end plate sealingly bonded to an upper end of the filter element that prevents fluid flow through axial upper ends of the pleats. A first passage is defined through a central opening of the end plate into the central area, while a second passage is defined between or through the end plate, and the peripheral region. The filter element has freely supported axially lower ends. There is a seal between the axial lower periphery of the filter element, and the housing, to prevent fluid bypass of the filter element. A flow path is defined between the first and second passages, in which the fluid passes radially through the pleats, and water in the fluid coalesces on the media and drains down into the collection region.

In a particular embodiment, the pleats include radially full, mid and short pleats in a repeating arrangement around the core. In a further embodiment, the annular filter element does not include a center tube. In certain embodiments, each of the pleats includes a plurality of embossments configured to add structural strength to the pleats. The annular end plate may be sealingly bonded to the upper end of the filter element using adhesive. In some embodiments, the annular end plate has no contact with the cup-shaped housing. In another embodiment, an interior wall of the housing includes a ledge, wherein the axially lower end of the filter element is sealingly attached to the ledge. In particular embodiments, the ledge extends radially inward from the lower wall no more than 0.75 inches.

In another aspect, embodiments of the invention provide a filter cartridge that includes a cylindrical housing with an open end and a partially open end opposite the open end, and a water bowl attached to the partially open end. An annular filter element is disposed within the housing and defines an annular peripheral region between a perimeter of the annular filter element and a side wall of the cylindrical housing. The filter element includes pleated media surrounding an axially-extending central area. The pleated media has pleats of different radial heights arranged circumferentially around the central area, wherein the annular filter element is sealingly attached to the cylindrical housing at the partially open end. In this context and as used throughout this application, the "radial height" is the distance from the pleat tip, located towards the center of the cylindrical housing, to the pleat base, located at a perimeter of the annular filter element closer to a side wall of the cylindrical housing.

A solid annular end plate is sealingly attached to an upper end of the annular filter element. A first passage is defined by a central opening of the annular end plate and the central area, and a second passage is defined by a space between the cylindrical housing and both the annular end plate and annular peripheral region. A fluid flow path is defined between the first and second passages in which fluid passes radially through the pleats such that water in the fluid coalesces on the media and drain down into the water bowl. The annular filter element further includes a seal on a lower end opposite the upper end. The seal is configured such that fluid flowing along the fluid flow path cannot bypass the annular filter element.

In particular embodiments, the pleats include radially full, mid and short pleats in a repeating arrangement around the core. In other embodiments, the annular filter element does not include a center tube. In certain embodiments, each of the pleats includes a plurality of embossments configured to add structural strength to the pleats. Furthermore, in some embodiments, the annular end plate has no contact with the cylindrical housing. The annular filter element may be sealingly attached at the partially open end of the cylindrical housing using adhesive.

The partially open end of the cylindrical housing may include an annular end wall attached to, and perpendicular to, a side wall of the housing, such that the annular end wall abuts and supports a perimeter portion of the annular filter element. Further, the annular filter element may be sealingly attached to the annular end wall of the cylindrical housing. In one example, a perimeter portion of the annular filter element, ranging from 0.25 to 0.50 of an inch, is sealingly attached to the annular end wall. The 0.25 to 0.50 of an inch is measured radially inward from the perimeter. In certain embodiments, the annular end wall extends radially inward from the side wall no more than 0.75 inches. In a particular embodiment, the annular end plate is impermeable. In others, wherein the water bowl is transparent.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
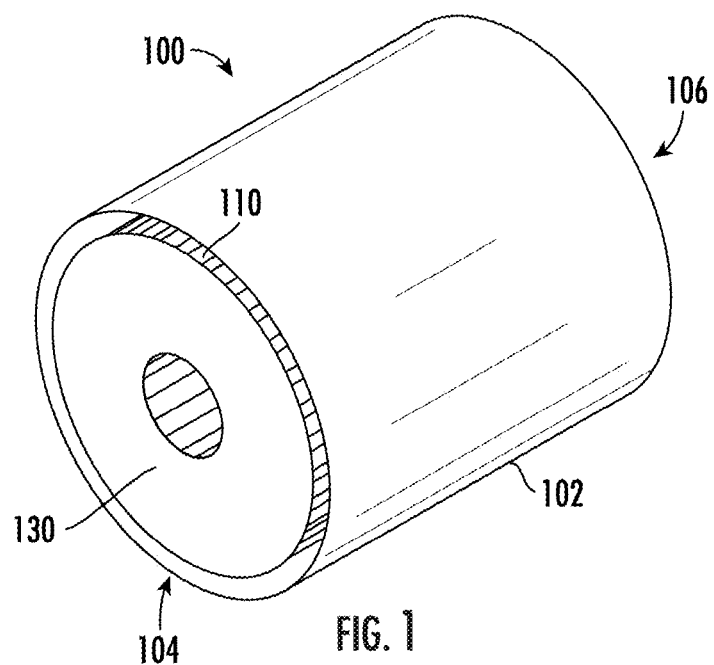
FIG. 1 is a perspective view of a filter cartridge constructed in accordance with and embodiment of the invention.
Figure 2:
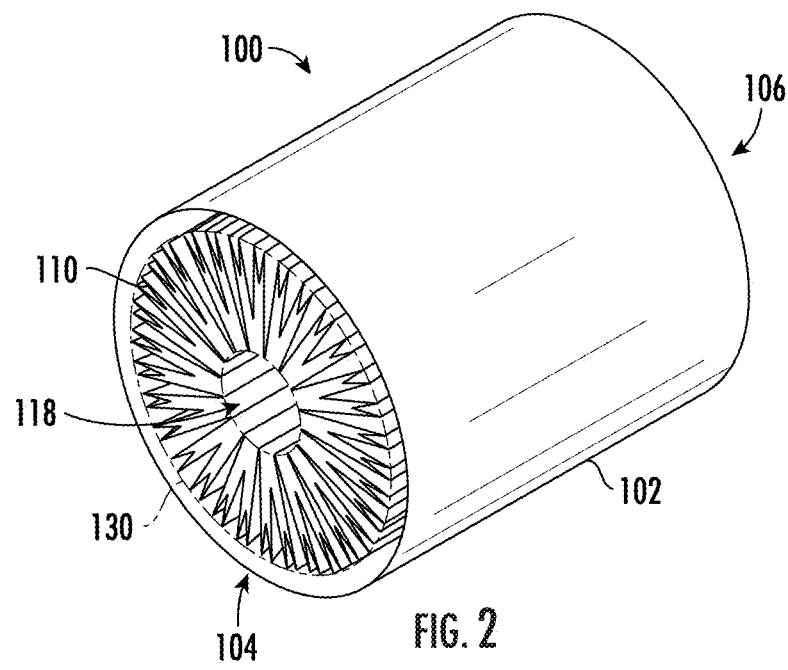
FIG. 2 is a perspective view of a filter cartridge of FIG. 1 without the annular end plate.

FIGS. 1 and 2 show perspective views of a filter cartridge 100, with and without an annular end plate 130, constructed in accordance with and embodiment of the invention. The filter cartridge 100 includes a cylindrical or cup-shaped housing 102 with an open end 104 and a partially open end 106 opposite the open end 104. An annular filter element 110 is disposed within, and supported by, the cylindrical housing 102. The filter cartridge 100 has an annular peripheral region 112 between a perimeter, or outer periphery, of the filter element 110 and a side wall 114 of the housing 102. There is a lower water collection region, which in certain embodiments is provided by a water bowl 116 (shown in FIG. 4) attached to the partially open end 106, between a lower end of the filter element 110 and a lower wall of the housing 102. In some cases, the water bowl 116 may be transparent to allow a user to see how much water collects in the water bowl 116.

In the embodiments shown, the annular filter element 110 does not include a center tube, which is typically provided in conventional filter cartridges of this type. One feature of the design disclosed herein is the use of a pleating arrangement that is structurally sufficient to permit the elimination of the structural center tube, which reduces the cost of manufacturing and simplifies the assembly process.

Figure 3:
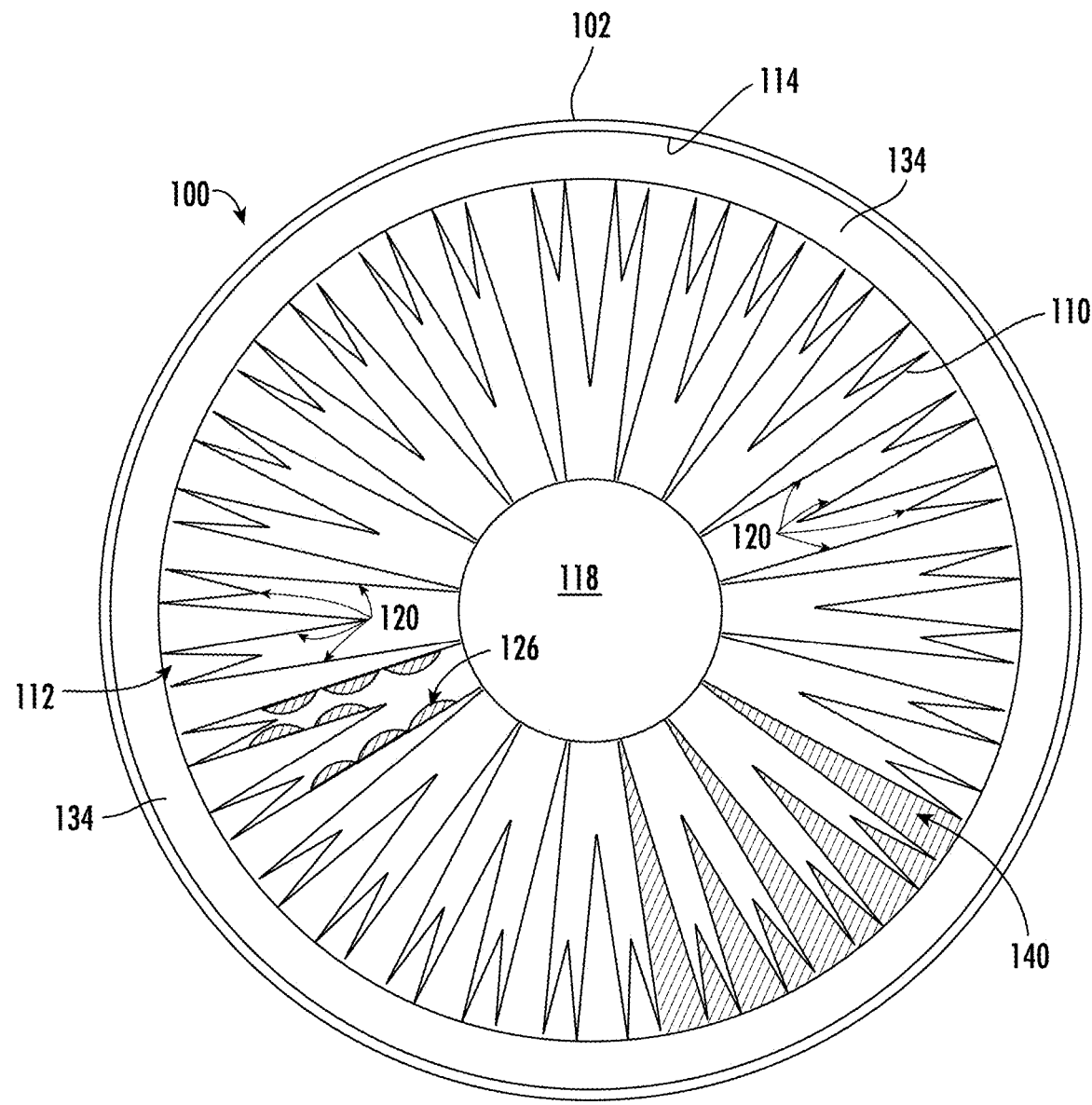
FIG. 3 is a top view of the filter cartridge without annular end plate; in accordance with an embodiment of the invention.

FIG. 3 is a top view of the filter cartridge without annular end plate; in accordance with an embodiment of the invention. As illustrated in FIG. 3, the longer pleats 120, i.e., those with the greatest radial height, alternatively add to the strength of the filter element 110 thus allowing for the elimination of the center tube. In addition, the longer pleats 120 add more filter media surface area, thereby improving water separation performance. In some embodiments, each of the pleats 120 includes a plurality of embossments 126 added to the surface to the pleats 120 in order to further increase the structural strength of the pleated media in the absence of a center tube. For expediency, the exemplary embossments 126 are shown only on a few pleats 120.

Figure 4:
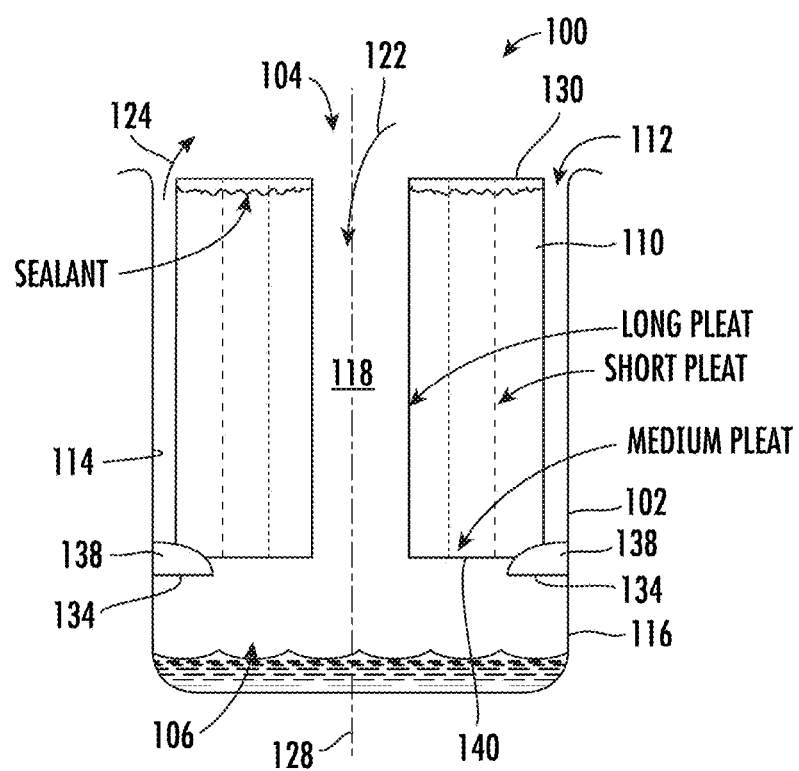
FIG. 4 is a cross-sectional view of the filter cartridge with water bowl, according to an embodiment of the invention.

As can be seen in the cross-sectional view of FIG. 4, the annular filter element 110 includes a first axially upper end opposite a second axially lower end, and also includes pleated media surrounding an axially-extending central area 118, with the media having pleats 120 of different radial heights arranged circumferentially around the annular filter element 110. FIG. 4 also shows the housing 102 with the water bowl 116 attached at the partially open end 106. In the context of the disclosed invention, the terms "axially" and "axially-extending" refer to a longitudinal axis 128 through the center of the cylindrical housing 102 and the axially-extending central area 118. In the embodiment shown in FIGS. 1-4, the pleats 120 include radially full, mid and short pleats 120 in a repeating arrangement around the axially-extending central area 118.

There is an annular end plate 130 sealingly attached or bonded to an upper end (the axially upper end) of the annular filter element 110 that prevents fluid flow through the axially upper ends of the pleats 120. Furthermore, in some embodiments including the embodiment shown, the annular end plate 130 has no contact with the cylindrical housing 102. In a particular embodiment, the annular end plate 130 is impermeable to fluids such that no fluid flow occurs through the end plate 130 itself.

A first passage 122 is defined through a central opening of the end plate 130 into the central area 118, while a second passage 124 is defined by the annular peripheral region 112, or the space between the cylindrical housing 102 and both the annular end plate 130 and the perimeter of the annular filter element 110. A fluid flow path is defined between the first and second passages 122, 124 in which fluid passes radially through the pleats such that water in the fluid is separated by the filter media, coalesces on the media, and drain down into the water bowl or collection region.

In FIG. 4, the fluid flow path is shown by arrows indicating entry of the fluid into the first passage 122 of the filter cartridge 100 via the axially-extending central area 118. After the fluid is filtered by annular filter element 110 and any water drains into the water bowl 116 or collection region, the fluid exits the filter cartridge 100 via the second passage 124 through the annular peripheral region 112. However, the design of the filter cartridge allows for the fluid path to be reversed such that the fluid to be filtered flows into the filter cartridge 100 via the second passage 124 and exits via the first passage 122.

The annular filter element 110 has a freely-supported axially lower end. The annular filter element 110 is sealingly attached to the cylindrical housing 102 at the partially open end 106. This sealing attachment is provided by a ledge seal 138 between an inner side wall surface of the housing 102 at the partially open end 106 of the cylindrical housing 102, and a perimeter portion of the axially lower end of the filter element 110. This sealing attachment between housing 102 and filter element 110 may be achieved using an adhesive, though a mechanical attachment is also envisioned.

To facilitate the ledge seal 138, the partially open end 106 of the cylindrical housing 102 may include an annular end wall 134, or ledge, attached to, and perpendicular to, a side wall 114 of the housing 102, such that the annular end wall 134 abuts and supports the perimeter portion of the annular filter element 110 that forms part of the aforementioned sealing attachment. In one example, only the first 0.25-of-an-inch section of the perimeter or outer diameter for each pleat 120 is sealed to the filter housing 102. In this particular instance, the 0.25 of an inch is measured radially inward from the perimeter of the annular filter element 110. In alternate embodiments, a half-inch perimeter portion of the annular filter element 110, or some range between 0.25 and 0.50 of an inch, is sealed to the filter housing 102. In a further embodiment, the annular end wall 134 extends radially inward from the side wall of the housing 102 no more than 0.75 inches.

As shown in FIGS. 3 and 4, a bottom seal 140 is provided at the axially lower end of the annular filter element 110. This bottom seal 140 is configured such that fluid flowing along the fluid flow path cannot bypass the annular filter element 110 and must therefore flow through the pleated media. The bottom seal 140 may be provided by an adhesive providing a barrier impermeable to fluids at the axially lower end of the annular filter element 110. In alternate embodiments, the bottom seal 140 may be provided by a mechanical seal that attaches to the lower end of the filter element 110. In FIG. 3, the bottom seal 140 is represented by the shaded areas. For the sake of expediency, only some pleats 120 have the shading. In the actual filter cartridge 100, every pleat 120 would be sealed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge, comprising:
a housing with an open end, and a partially open end opposite the open end;

an annular filter element supported in the housing and defining an annular peripheral region between an outer periphery of the filter element and a side wall of the housing, and a lower water collection region between a lower end of the filter element and a lower wall of the housing, the filter element including pleated media surrounding an axially-extending central area, with the media having pleats of different radial heights arranged circumferentially around the central area;

an annular end plate sealingly bonded to an upper end of the filter element and preventing fluid flow through axial upper ends of the pleats, with a first passage defined through a central opening of the end plate into the central area, and a second passage defined between or through the end plate, and the peripheral region;

the filter element being freely supported without a center tube; and a seal between an axial lower periphery of the filter element, and the housing, preventing fluid bypass of the filter element;

wherein a flow path is defined between the first and second passages, where fluid passes radially through the pleats, and water in the fluid coalesces on the media and drains down into the collection region; and wherein the housing is cylindrical and the partially open end of the cylindrical housing includes an annular end wall attached to, and perpendicular to, a side wall of the housing, such that the annular end wall abuts and supports a perimeter portion of the annular filter element.

2. The filter cartridge as in claim 1, wherein the pleats include radially full, mid and short pleats in a repeating arrangement around the axially-extending central area of the filter element.

3. The filter cartridge of claim 1, wherein each of the pleats includes a plurality of embossments configured to add structural strength to the pleats.

4. The filter cartridge of claim 1, wherein the annular end plate is sealingly bonded to the upper end of the filter element using adhesive.

5. The filter cartridge of claim 1, wherein the annular end plate has no contact with the housing.

6. The filter cartridge of claim 1, wherein an interior wall of the housing includes a ledge, wherein an axially lower end of the filter element is sealingly attached to the ledge.

7. The filter cartridge of claim 6, wherein the ledge extends radially inward from the lower wall no more than 0.75 inches.

8. The filter cartridge of claim 1, wherein the annular filter element further includes a seal on the lower end opposite the upper end, the seal configured such that fluid flowing along the fluid flow path cannot bypass the annular filter element.

9. The filter cartridge of claim 1, wherein the annular filter element is sealingly attached to the annular end wall of the cylindrical housing where the annular filter element abuts the annular end wall.

10. The filter cartridge of claim 9, wherein a perimeter portion of the annular filter element, ranging from 0.25 of an inch to 0.50 of an inch measured radially inward from a perimeter of the filter element, is sealingly attached to the annular end wall.

11. The filter cartridge of claim 1, wherein the annular end wall extends radially inward from the side wall no more than 0.75 inches.

12. The filter cartridge of claim 1, wherein the annular filter element is sealingly attached at the partially open end of the cylindrical housing using adhesive.

13. The filter cartridge of claim 1, wherein the annular end plate is impermeable.

14. The filter cartridge of claim 1, wherein the housing includes a water bowl attached to a partially-open end of the housing.

15. The filter cartridge of claim 14, wherein the water bowl is transparent.

* * * * *